United States Patent [19]

Bailey

[11] Patent Number: 5,169,125
[45] Date of Patent: Dec. 8, 1992

[54] SELF-ALIGNING GATE VALVE
[75] Inventor: Stuart L. Bailey, San Antonio, Tex.
[73] Assignee: Baker Hughes Incorporated, Houston, Tex.
[21] Appl. No.: 664,872
[22] Filed: Mar. 5, 1991
[51] Int. Cl.⁵ .............................................. F16K 3/18
[52] U.S. Cl. ...................... 251/327; 251/84; 251/175
[58] Field of Search ................ 251/84, 175, 195, 326, 251/193, 327

[56] References Cited
U.S. PATENT DOCUMENTS

| | | | |
|---|---|---|---|
| 2,192,331 | 3/1940 | Schaefer | 251/195 X |
| 3,215,399 | 11/1965 | McInerney | 251/195 |
| 3,223,380 | 12/1965 | Halmuth | 251/327 X |
| 3,893,652 | 7/1975 | Natbo | 251/84 |

Primary Examiner—John C. Fox
Attorney, Agent, or Firm—Rosenblatt & Associates

[57] ABSTRACT

A gate valve provides an efficient and effective seal from high pressures to pressure differentials below 50 psi through a self-aligning gate of reduced mass (semigate). The invention provides a transmission between the gate and stem which permits its sealing surface to remain normal to the relative surface of the seat irrespective of pressure, circulation rate, or flow medium (gas or liquid). This is accomplished through the full floating nut element which, when loosely engaged to the stem and inserted into an oversized slot at the upper end of the semi-gate, allows the gate to move axially in the direction of flow without interfering with the vertical movement of the gate by the stem. This feature is accomplished by introducing a clearance between the stem and nut. The gate is of reduced mass to allow a more instantaneous response to pressure transients because of its lighter weight and reduced profile. By eliminating substantially the lower 50 percent of the gate's flow port, a large reduction of gate mass is achieved, allowing further mass and size reductions to the gate housing.

10 Claims, 2 Drawing Sheets

SELF-ALIGNING GATE VALVE

FIELD OF THE INVENTION

The field of this invention relates to gate valves, particularly those designed for tight closure with low differential pressures.

BACKGROUND OF THE INVENTION

Both rising stem and nonrising stem through conduit gate valves are utilized in industry to control the flow of fluids in flow passages such as in land-based and subsea oil and gas wells and in petroleum and petrochemical pipelines. A common concern of both gate valve types is to provide an effective seal in a gate valve flow passage for the entire set of pressure differentials encountered during various fluid transportation and industrial operations. Various structural approaches have been made to effect a better seal when high pressure differentials (>5000 psi) are encountered and to alleviate problems opening and closing the gate valve during high-pressure operations.

U.S. Pat. No. 3,269,694, issued to Hardison, introduces the use of a pressure-balance shaft and lever-type gate valve to address the problem of shaft binding when the valve is opened and closed during high-pressure operations. It also provides a means for preventing spring-biased, floating, or pressure-actuated seals from moving into the path of the gate and thus being damaged during valve opening and closing.

U.S. Pat. No. 4,376,524, issued to Shelton, addressed the need to alleviate the high thrust and torque requirements for gate members in nonrising stem gate valves during opening and closing when such gate members were subjected to high pressures (>5000 psi). Thus, it introduced a low-stress connection in utilizing a series of extensions and collars to reduce the possibility of stress-produced hydrogen embrittlement and hydrogen corrosion cracking of the gate member.

U.S. Pat. No. 4,510,960 illustrates a gate secured to a stem by use of a nut secured rigidly to a threaded stem. U.S. Pat. No. 3,387,819 discloses a gate valve body construction which includes reinforcing members. U.S. Pat. No. 2,596,817 discloses a gate valve where the stem is connected through the gate by a slot in the gate. The gate bottom is also truncated. U.S. Pat. No. 2,793,002 discloses a threaded stem connected to a gate, as does U.S. Pat. No. 4,711,262. U.S. Pat. No. 4,377,273 discloses a rigid connection between the gate and the stem. U.S. Pat. No. 4,230,299 discloses a stem pinned to the gate. U.S. Pat. No. 3,188,049 indicates a gate having a slot to accommodate a projection on the stem to secure the stem to the gate. The NL Shaffer Co. type V gate valve, as indicated in its 1982 and 1983 catalog, included a gate having a T-shaped slot therethrough, a stem with a T-shaped nut threadedly secured to it, adapted for slidable mounting in the slot in the gate for lifting the gate up and down. U.S. Pat. No. 243,846 shows a threaded stem connected to a gate However, during certain operations, such as gas injection operations performed during secondary or enhanced oil recovery, the pressure differentials encountered can be very low (<100 psi), and a requirement exists to provide an effective seal at these low pressures which will provide an instantaneous dynamic response to the pressure transients experienced during these operations.

A situation often encountered when a perfect gas-tight seal is not maintained between the gate and its seat is that operators, in an attempt to effect a perfect seal, overtighten the handle and strip the stem and handle threads. This damage is prevented by utilizing the spring-energized, full floating, parallel gate/seat design which does not require a wedging force to effect a gas-tight seal.

A further common concern of all gate valves is their efficient manufacture at an industrial performance level. Thus, it is the general object of this invention to provide a more effective and more efficient low- and high-pressure gas-tight seal between the gate and its seat in gate valves such as those typically used in gas injection operations in secondary and enhanced oil recovery.

It is a further object of this invention to provide such an improved seal at lower production costs while maintaining a modularity in the design to allow for a complete replacement of the transmission assembly (stem and nut) without removing the gate from the body/seat assembly.

SUMMARY OF THE INVENTION

A gate valve provides an efficient and effective seal from high pressures to pressure differentials below 50 psi through a self-aligning gate of reduced mass (semi-gate). The invention provides a transmission between the gate and stem which permits its sealing surface to remain normal to the relative surface of the seat irrespective of pressure, circulation rate, or flow medium (gas or liquid). This is accomplished through the full floating nut element which, when loosely engaged to the stem and inserted into an oversized slot at the upper end of the semi-gate, allows the gate to move axially in the direction of flow without interfering with the vertical movement of the gate by the stem. This feature is accomplished by introducing a clearance between the stem and nut. The gate is of reduced mass to allow a more instantaneous response to pressure transients because of its lighter weight and reduced profile. By eliminating substantially the lower 50 percent of the gate's flow port, a large reduction of gate mass is achieved, allowing further mass and size reductions to the gate housing.

DETAILED DESCRIPTION OF THE PREFERRED EMBODIMENT

Figure 1:
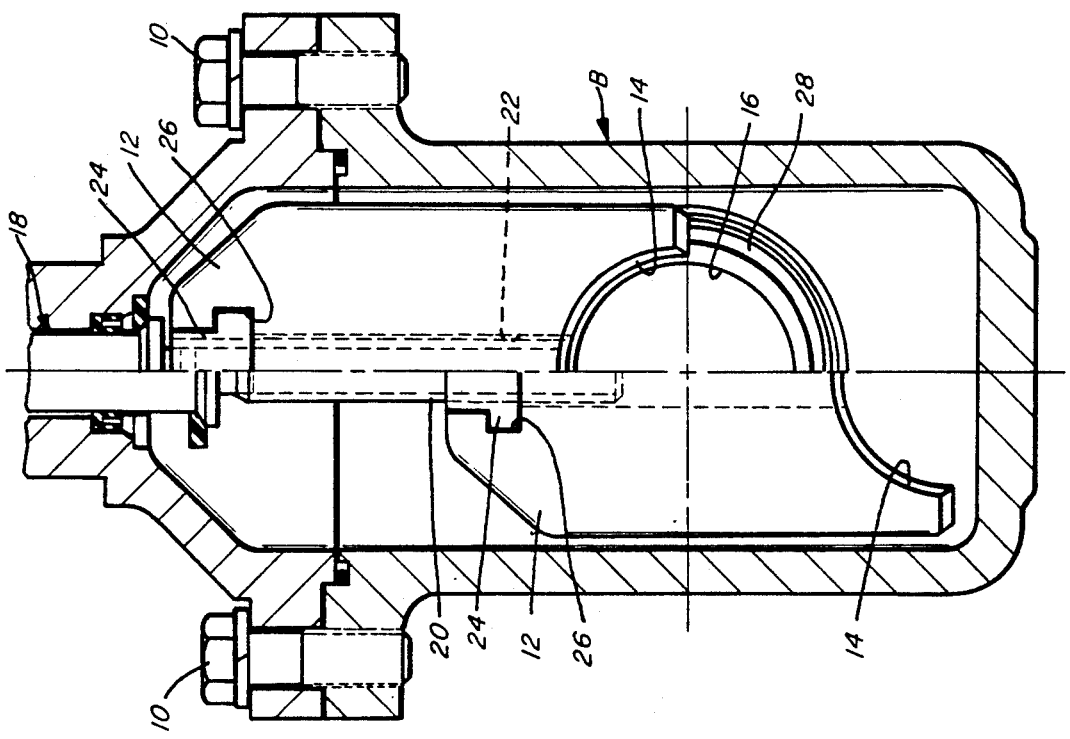
FIG. 1 is a sectional elevational view of the valve, showing the gate in the open and closed positions.
Figure 4:
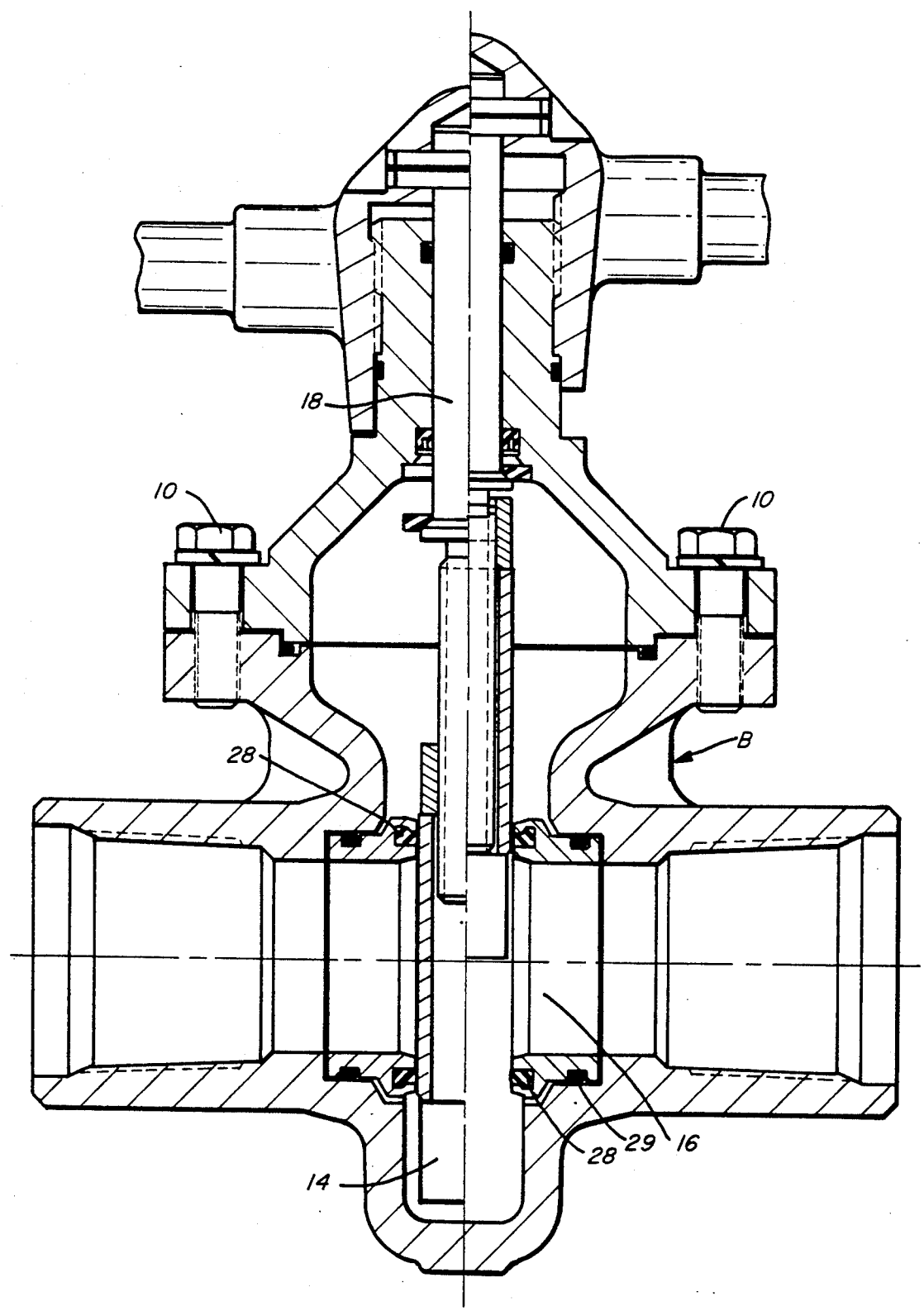
FIG. 4 is a sectional elevation view of the valve shown in two positions.

Referring now to FIG. 1, the valve body B is illustrated and shown in two sections connected by bolts 10. Gate 12 is mounted within body B to reciprocate between the two positions, as illustrated in FIG. 1. Gate 12 has a semi-circular cutout 14 which is in alignment with the valve bore 16 when the valve is open, as shown in the righthand side of FIG. 1. When the valve is closed, the solid part of gate 12 is in alignment with bore 16, as shown in the lefthand side of FIG. 1. Those skilled in the art can readily appreciate that the use of a preferably semicircular cutout dramatically reduces the length of the gate 12, as well as corresponding length of the body B. Other cutout shapes can be used without departing from the spirit of the invention. The weight of the gate 12 is also reduced, facilitating its ability to close under low differential pressures, as will be explained below.

Figure 2:
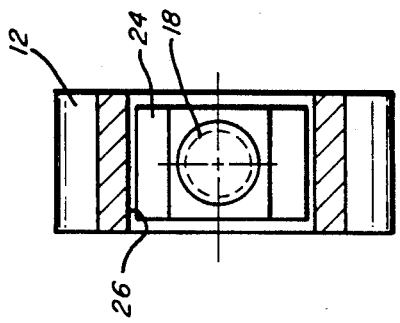
FIG. 2 is a plan view looking down at the gate when the valve is open.
Figure 3:
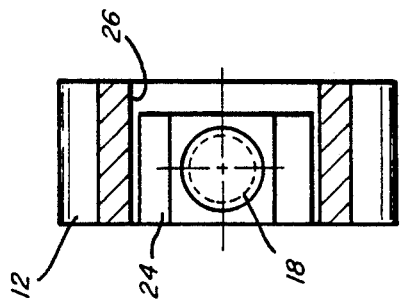
FIG. 3 is a plan view looking down at the gate when the valve is closed.

The upper end of this valve is conventional and is not illustrated except where the stem 18 enters the body B. The stem 18 has a lower end 20, which preferably threaded, and extends into a bore 22 in the gate 12. The lower end 20 of stem 18 passes through nut 24. Nut 24 has a shape conforming to a cutout 26 in gate 12. In the particular case illustrated in FIG. 1, the cutout 26 in gate 12 has a T-shape as does the nut 24. While nut 24 is engaged by lower end 20, the nature of the engagement is a loose one, allowing nut 24 some relative degree of freedom with respect to stem 18. Additionally, the cutout 26, while conforming to the shape of nut 24, is larger than nut 24, thereby giving the gate 12 some degree of freedom of movement with respect to nut 24, as illustrated in FIGS. 2 and 3. As shown in FIG. 2 with the valve open, the gate is out of the flowpath. When the valve is closed by lowering the gate 12, nut 24 is free to move with respect to both gate 12 and lower end 20 of stem 18. There is, thus, provided two degrees of freedom due to the provision for relative movement between nut 24 and lower end 20 and nut 24 with cutout 26. The result of the greater degree of freedom provided by this arrangement is shown in FIG. 3 when the valve is closed. The gate 12 is free to move closer to the downstream seals in response to very low differential pressures for sealing of the pipe when the valve is in the closed position. Those skilled in the art will appreciate that seals on either side of the gate 12 are provided within the valve body circumscribing the bore 16 for sealable engagement with gate 12.

It is also within the spirit of the invention to provide a connection between the lower end 20 of the stem 18 and the nut 24 in a manner different than a threaded connection as long as there is a loose connection therebetween to provide the additional degree of freedom for gate 12 to move longitudinally in response to differential pressure across it for sealable contact with the adjacent seals that circumscribe the valve bore 16. It should also be realized that the shape of nut 24 can vary greatly as long as the cutout 26 is so proportioned to engage loosely the nut 24 to allow degree of freedom of movement of gate 12 with respect to nut 24 axially along the direction of flow through the valve and also angularly about the point of contact between nut 24 and cutout 26. The word "nut" is intended to include any loosely mounted projection which is capable of holding the gate 12 and being loosely fitted to a stem 18.

In the embodiment shown, bore 22 accommodates lower end 20 of stem 18 as the gate 12 moves up and down, as shown in FIG. 1.

The apparatus of the present invention accomplishes sealing at low differential pressure against seals 28. This sealing action is facilitated by the lighter weight of gate 12 due to cutout 14 and the additional degrees of freedom given to gate 12 due to its unique mounting wherein a nut 24 is loosely mounted to a stem 18 and the nut 24 is further loosely mounted to a gate 12. The gate 12 is, thus, provided with additional flexibility in axial movement to bring the gate 12 into close proximity with seal 28 on low differential pressures of under 100 psi. The combination of the dual point mounting, each of which giving the gate 12 further freedom to move axially, pivot, or otherwise flex in response to low differentials, coupled with its low weight due to cutout 14, permits effective sealing at very low pressures as low as a few pounds differential.

The foregoing disclosure and description of the invention are illustrative and explanatory thereof, and various changes in the size, shape and materials, as well as in the details of the illustrated construction, may be made without departing from the spirit of the invention.

I claim:

1. A mounting system for connecting a gate to a stem in a gate valve, comprising:
a unitary gate, reciprocally movable in a plane of movement between an open and closed position;
support means for said gate acting between said gate and the stem, said support means being loosely fitted to said gate and adapted for a threaded connection with radial thread clearance to the stem to facilitate movement of said gate transversely to said plane of movement in response to differential pressure applied to said gate upon movement of said gate in said plane toward said closed position.

2. The apparatus of claim 1, wherein said support means further comprises:
a nut threadedly but loosely mounted to the stem;
a slot defined in said gate to loosely retain said nut.

3. The apparatus of claim 2, further comprising:
a cutout at the lower end of said gate.

4. The apparatus of claim 3, further comprising:
sealing means selectively engageable with said gate for sealing therewith;
said gate, due to said loose connections at said nut to both the stem and said gate, movably mounted to contact said seal for sealing at pressure differentials below 50 psi.

5. The apparatus of claim 4, wherein:
said gate contains a bore to accommodate the stem as it passes through said nut in moving said gate between said open and closed positions.

6. A gate valve comprising:
a body;
a stem acting within said body;
a unitary gate reciprocally movable in a plane of movement between an open and closed position;
support means for said gate acting between said gate and said stem, said support means being loosely fitted to said gate and adapted for a threaded connection with radial thread clearance to said stem to facilitate movement of said gate transversely to said plane of movement in response to differential pressure applied to said gate upon movement of said gate in said plane toward said closed position.

7. The apparatus of claim 6, wherein said support means further comprises:
a nut threadedly but loosely mounted to the stem;
a slot defined in said gate to loosely retain said nut.

8. The apparatus of claim 7, further comprising:
a cutout at the lower end of said gate.

9. The apparatus of claim 8, further comprising:
sealing means selectively engageable with said gate for sealing therewith;
said gate, due to said loose connections at said nut to both the stem and said gate, movably mounted to contact said seal for sealing at pressure differentials below 50 psi.

10. The apparatus of claim 9, wherein:
said gate contains a bore to accommodate the stem as it passes through said nut in moving said gate between said open and closed positions.

* * * * *